(12) United States Patent
Nakamura et al.

(10) Patent No.: US 7,468,897 B2
(45) Date of Patent: Dec. 23, 2008

(54) RECTIFIER WITHOUT ACTIVE SWITCHES

(75) Inventors: Nobuhiro Nakamura, Osaka (JP);
Masafumi Hashimoto, Osaka (JP)

(73) Assignee: Daikin Industries, Ltd., Osaka-shi (JP)

( * ) Notice: Subject to any disclaimer, the term of this patent is extended or adjusted under 35 U.S.C. 154(b) by 341 days.

(21) Appl. No.: 10/580,272

(22) PCT Filed: Nov. 18, 2004

(86) PCT No.: PCT/JP2004/017184

§ 371 (c)(1),
(2), (4) Date: May 25, 2006

(87) PCT Pub. No.: WO2005/053144

PCT Pub. Date: Jun. 9, 2005

(65) Prior Publication Data

US 2007/0133237 A1   Jun. 14, 2007

(30) Foreign Application Priority Data

Nov. 27, 2003  (JP) ............................. 2003-396613
Mar. 24, 2004  (JP) ............................. 2004-086472

(51) Int. Cl.
*H02H 7/125* (2006.01)
(52) U.S. Cl. ........................................ 363/52; 363/126
(58) Field of Classification Search .................. 363/52, 363/126
See application file for complete search history.

(56) References Cited

U.S. PATENT DOCUMENTS 7,259,479 B1 * 8/2007 Member ...................... 307/82

FOREIGN PATENT DOCUMENTS

| JP | 58-43182 A | 3/1983 |
| JP | 6-284729 A | 1/1994 |
| JP | 11-285254 A | 10/1999 |

\* cited by examiner

*Primary Examiner*—Shawn Riley
(74) *Attorney, Agent, or Firm*—Birch, Stewart, Kolasch & Birch, LLP

(57) ABSTRACT

In this power converter, a first capacitor for stepping down of voltage, a first diode for half-wave rectification, and a second capacitor for smoothing are interposed between first and second input connections for input of AC voltage; and a second diode for discharge of the first capacitor is interposed between the second input connection and an input end of the first diode. AC voltage supplied from an AC power supply is divided (stepped down) by the first and second capacitors, rectified to DC voltage by the first diode, smoothed by the second capacitor, and supplied, as an output voltage defined by Zener diodes, to the load side through the first and second output connections.

8 Claims, 16 Drawing Sheets

F I G . 1
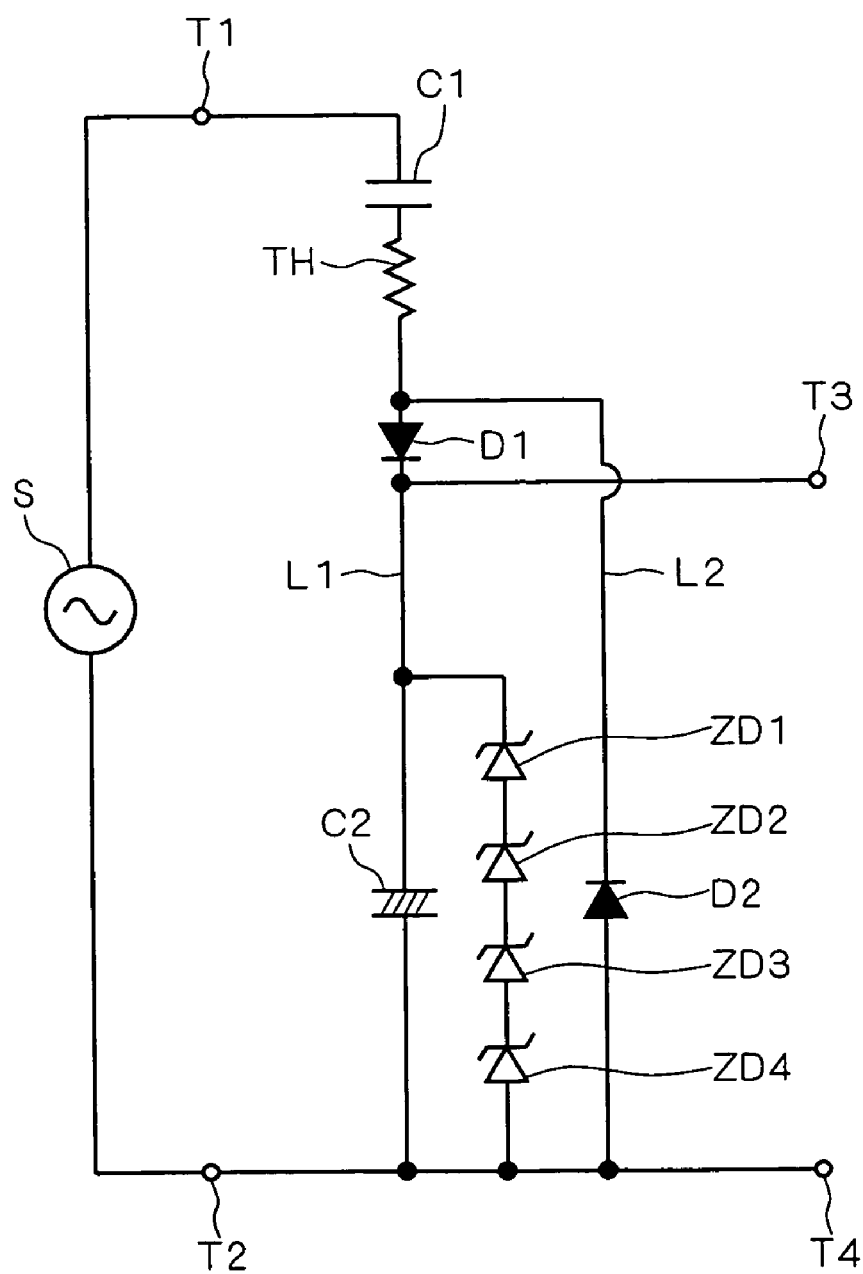

F I G . 1 7
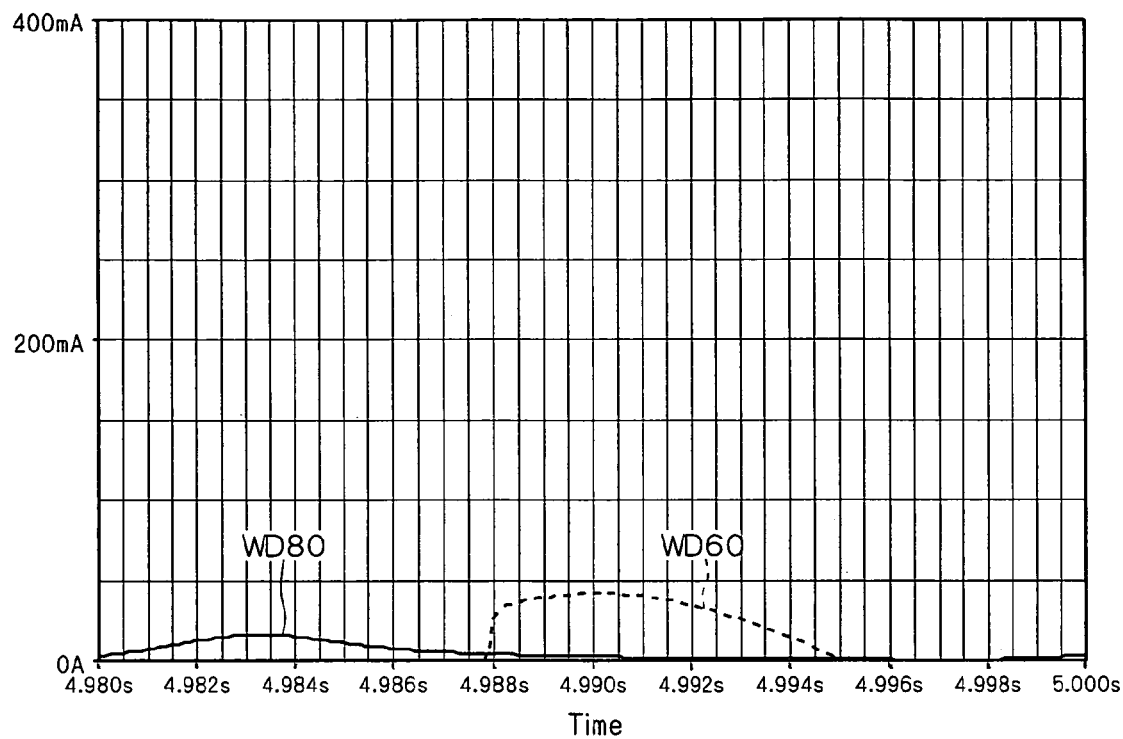
F I G . 1 8
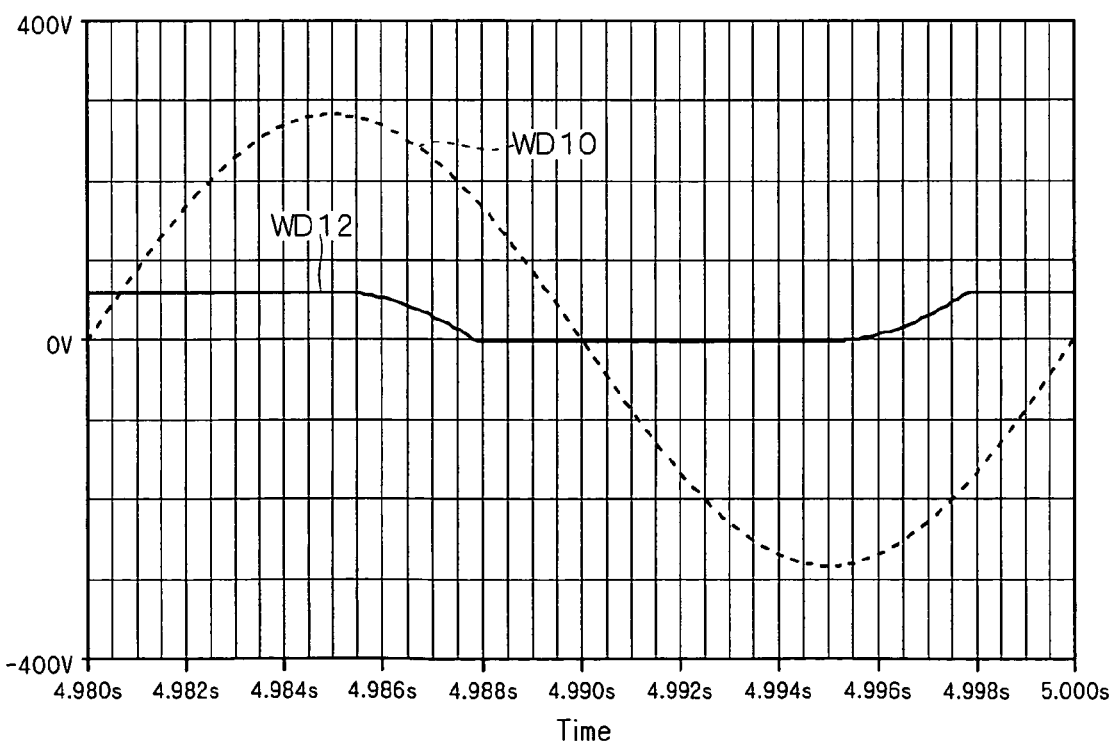

RECTIFIER WITHOUT ACTIVE SWITCHES

TECHNICAL FIELD

The present invention relates to a power converter for stepping down and converting AC voltage to DC voltage.

BACKGROUND ART

For example, in the case of air conditioners and the like, while the power supply voltage of the outdoor unit is three-phase AC voltage of 200 V, the power supply of a communication system in the indoor unit and the like may require DC voltage of 60V. In this case, the three-phase AC voltage of 200V needs to be converted to DC voltage of 60V for supply to the communication system.

FIG. 24 is a circuit diagram of a conventional power converter. In this power converter, AC voltage supplied from an AC power supply S through first and second input connections T1 and T2 is stepped down and half-wave rectified to DC voltage, and then supplied to loads (not shown) through first and second output connections T3 and T4.

Between the first and second input connections T1 and T2, a step-down resistance unit RU including a plurality of resistors, a diode D11, and a capacitor C11 are interposed in series in the order described from the first input connection T1 side. The forward direction of the diode D11 is from the first input connection T1 side toward the second input connection T2. Further, a plurality of series-connected Zener diodes ZD11 to ZD13 are connected in parallel to the capacitor C11. The forward direction of these Zener diodes ZD11 to ZD13 is from the second input connection T2 side toward the first input connection T1. Further, a resistor R11 for discharge of the capacitor C11 is connected in parallel to the capacitor 11.

The first output connection T3 is connected to a connection on the downstream side in the forward direction of the diode D11, and the second output connection T4 is connected to the second input connection T2.

More specifically, for example, an AC voltage of 200 V (peak value) is applied from the AC power supply S to the first input connection T1 with reference to the potential of the second input connection T2. Then, this voltage is converted into a DC voltage of 60 V. Corresponding to this, the resistance unit RU employed has a resistance value necessary to step down AC voltage of 200 V to DC voltage of 60 V. The capacitor C11 has a capacitance of 470 µF, and the Zener diodes ZD11 to ZD13 each have a Zener voltage of 20 V.

Then, the AC voltage supplied from the AC power supply S is stepped down by the resistance unit RU, half-wave rectified by the diode D11, stabilized by the capacitor C11 and the Zener diodes ZD11 to ZD13, and outputted as a DC voltage of 60V to the loads.

Here, FIGS. 25 and 26 are waveform charts respectively illustrating potential and current changes of each component on the circuit of FIG. 24. A waveform WD11 in FIG. 25 shows the potential change of the first input connection T1 with reference to the potential of the second input connection T2; a waveform WD12 in the same figure shows the change of voltage across the resistance unit RU; and a waveform WD13 in the same figure shows the potential change of the second output connection T3 with reference to the potential of the second input connection T2. During the positive part of the waveform WD12, joule losses occur in the resistance unit RU.

A waveform WD14 in FIG. 26 shows the change of current flowing from the AC power supply S to the first input connection T1 when the direction of current flowing from the first input connection T1 toward the AC power supply S is the positive direction. A waveform WD15 in the same figure shows the change of current supplied to the capacitor C11 when the direction of current flowing through the first diode D11 toward the capacitor C11 is the positive direction. A waveform WD16 in the same figure shows the change of current flowing to the Zener diodes ZD11 to ZD13 when the direction of current flowing in the forward direction of the Zener diodes ZD11 to ZD13 is the positive direction.

One of prior-art techniques for stabilizing the terminal voltage of a smoothing capacitor is that described in patent document 1 for use in a full-wave rectifying circuit.

Patent Document 1: Japanese Patent Application Laid-open No. 6-284729

DISCLOSURE OF THE INVENTION

Since the conventional power converter shown in FIG. 24 uses the resistance unit RU for stepping down the voltage, large joule losses occur in the resistance unit RU, and thus, the efficiency is low. Besides, the use of a high-capacity resistance unit RU, which is expensive and large in size, has problems in terms of efficiency, cost, device size, and the like.

Thus, the problem to be solved by the present invention is to provide a power converter that achieves high efficiency, low cost, size reduction, and the like.

One aspect of the invention is intended for a power converter for stepping down and converting AC voltage (S) to DC voltage. The power converter includes first and second input connections (T1, T2) for inputting output of the AC voltage; a first capacitor (C1) and a second capacitor (C2) interposed in series on a first electric connection line (L1) between the first input connection (T1) and the second input connection (T2), in order from a side of the first input connection; a first diode (D1) interposed between the first capacitor and the second capacitor on the first electric connection line so that its forward direction is toward the second input connection; a second diode (D2) interposed on a second electric connection line (L2) so that its reverse direction is toward the second input connection, the second electric connection line connecting a point between the first capacitor and the first diode on the first electric connection line, and the second input connection; a first output connection (T3) for output of the DC voltage, which is connected between the first diode and the second capacitor on the first electric connection line; and a second output connection (T4) for output of the DC voltage, which is connected to the second input connection.

According to another aspect of the invention, the power convertor further includes a Zener diode (ZD) interposed between the first output connection (T3) and the second output connection (T4) so that its forward direction is toward the first output connection.

According to another aspect of the invention, the power converter further includes a resistor (R) interposed on the first electric connection line (L1) on a side closer to the first input connection than a position of connection with the second electric connection line (L2).

According to another aspect of the invention, in the power converter, the resistor is a thermistor.

According to further aspect of the invention, the power converter further includes a third capacitor (C3) connected between one end of the resistor (R) and the second input connection (T2).

According to further aspect of the invention, in the power converter, the one end of the resistor (R) is the end on the side of the second input connector (T2).

According to another aspect of the invention, in the power converter, the one end of the resistor (R) is the end on the side of the first input connector (T1).

According to yet another aspect of the invention, in the power converter, a capacity ratio of the first capacitor is set to about 1:1.

According to further aspect of the invention, in the power converter, a capacity ratio of the first capacitor to the third capacitor is set to about 1:1.

According to another feature of the invention, in the power converter, a capacity ratio of the first capacitor is set to about 1:1.

According to one feature of the invention, the power converter further includes a resistor (R) interposed on the first electric connection line (L1) on a side closer to the first input connection than a position of connection with the second electric connection (L2).

According to another aspect of the invention, in the power converter, the resistor is a thermistor.

According to yet another feature of the invention, the power converter further includes a third capacitor (C3) connected between one end of the resistor (R) and the second input connection (T2).

According to one feature of the invention, in the power converter, the one end of the resistor (R) is the end on the side of the second input connection (T2).

According to another aspect of the invention, in the power converter, the one end of the resistor (R) is the end on the side of the first input connection (T1).

According to one aspect of the invention, in the power converter, a capacity ratio of the first capacitor to the third capacitor is set to about 1:1.

According to yet another feature of the invention, in the power converter, a capacity ratio of the first capacitor to the third capacitor is set to about 1:1.

According to one aspect of the invention, in the power converter, a capacity ratio of the first capacitor to the third capacitor is set to about 1:1.

According to another feature of the invention, in the power converter, a capacity ratio of the first capacitor to the second capacitor is set to 1:1000.

According to further aspect of the invention, AC voltage supplied through the first and second input connections is divided (stepped down) by the first and second capacitors, rectified to DC voltage by the first diode, smoothed by the second capacitor, and supplied to the load side through the first and second output connections.

According to the invention of claim 1, AC voltage supplied through the first and second input connections is divided (stepped down) by the first and second capacitors, rectified to DC voltage by the first diode, smoothed by the second capacitor, and supplied to the load side through the first and second output connections.

In this way, the voltage drop is caused not by a resistor but by the capacitor. This is highly efficient because no joule loss occurs during the voltage drop, and thus, there is no need to consider a countermeasure against heat for peripheral components. Also, there is no need to use an expensive and high-capacity step-down resistor as in conventional techniques, which results in cost reduction.

Further, the unnecessity of using a step-down resistor, which is often large in size, allows a reduction in the mounting area of components and in the size of a device configuration such as a printed circuit board, which is advantageous in terms of structure and cost.

According to one aspect of the invention, the Zener diode enables the output of a stable DC voltage.

According to further aspect of the invention, a resistor such as a thermistor allows effective control of the rush current of the flowing on the first and second electric connection lines.

According to yet another aspect of the invention, it is possible to control overcurrent on the first electric connection line, which is caused by ripples of the AC voltage. Especially in the case where the Zener diode is adopted, the thermal load of the Zener doide can be reduced.

According to an aspect of the invention, the time constant of a CR series circuit formed of the first capacitor and the resistor allows the effective control of the influence of the ripples of the AC voltage.

According to further aspect of the invention, it is not necessary to increase the rating of the resistor even if the frequency of ripples of the AC voltage is high.

According to yet another aspect of the invention, the flow of unnecessary current to the Zener doide can be suppressed even if the ripple amplitude of the AC voltage is about two times the DC voltage to be outputted.

According to further aspect of the invention, the input AC voltage can effectively be divided and rectified to DC voltage by the first and second capacitors.

These and other objects, features, aspects and advantages of the present invention will become more apparent from the following detailed description of the present invention when taken in conjunction with the accompanying drawings.

BRIEF DESCRIPTION OF DRAWINGS

[FIG. 1] a circuit diagram of a power converter according to a first preferred mode of the present invention;

[FIG. 17] a graph showing the characteristics of the power converter according to the third preferred mode;

[FIG. 18] a graph showing the characteristics of the power converter according to the third preferred mode;

BEST MODE FOR CARRYING OUT THE INVENTION

First Preferred Mode

Figure 2:
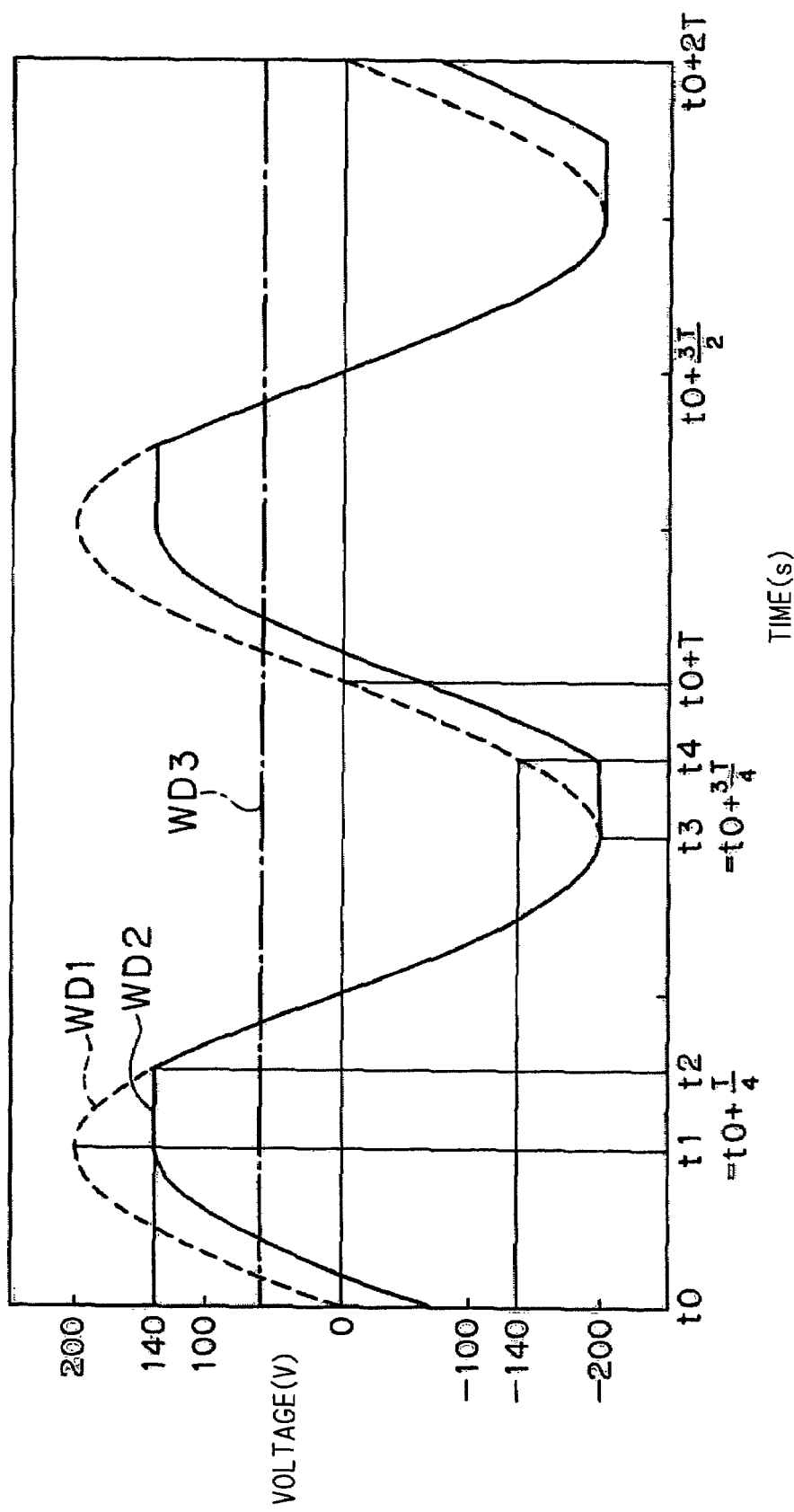
[FIG. 2] a waveform chart illustrating the potential change of each component on the circuit of FIG. 1.

FIG. 1 is a circuit diagram of a power converter according to a first preferred mode of the present invention. This power converter steps down and converts AC voltage supplied from an AC power supply S to DC voltage for output. Its components include, as shown in FIG. 1, first and second input connections T1 and T2 for input of AC voltage, first and second output connections T3 and T4 for output of DC voltage, first and second capacitors C1 and C2, first and second diodes D1 and D2, a plurality of Zener diodes ZD1 to ZD4, and a thermistor TH.

The first and second capacitors C1 and C2 are interposed in series on a first electric connection line L1 which connects the first input connection T1 and the second input connection T2, in the order described from the first input connection side. The first capacitor C1 is provided for a voltage drop using voltage division, and the second capacitor C2 for smoothing. For an effective voltage drop in the first capacitor C1, the capacity ratio of the first capacitor C1 to the second capacitor C2 is set to, for example, 1:1000.

The first diode D1 for half-wave rectification is interposed between the first capacitor C1 and the second capacitor C2 on the first electric connection line L1 so that its forward direction is from the side of the first input connection T1 toward the second input connection T2.

The second diode D2 is provided for discharge of the first capacitor C1 and interposed on a second electric connection line L2 so that its reverse direction is toward the second input connection T2, the second electric connection line connecting a point between the first capacitor C1 and the first diode D1 on the first electric connection line L1, and the second input connection T2.

The first output connection T3 is connected between the first diode D1 and the second capacitor C2 on the first electric connection L1, and the second output connection T4 is connected to the second input connection T2.

The plurality of Zener diodes ZD1 to ZD4 are interposed in series between the first output connection T3 and the second output connection T4 so that their forward directions are from the side of the second output connection T4 toward the first output connection T3.

The thermistor TH is for controlling rush current and interposed on the first electric connection line L1 on the side closer to the first input connection T1 than a position of connection with the second electric connection line L2. While, in the configuration of FIG. 1, the thermistor TH is interposed on the second input connection T2 side of the capacitor C1, it may be interposed on the first input connection T1 side of the capacitor C1.

Here, out of the components of the circuit shown in FIG. 1, at least the first and second diodes D1 and D2 and the Zener diodes ZD1 to ZD4 may be integrated in a single hybrid circuit (HIC).

More specifically, this power converter converts an AC voltage of, for example, 200 V (peak value) supplied from the AC power supply S to a DC voltage of 60 V. For example, with the second input connection T2 kept at a ground potential, an AC voltage of 200 V is applied to the first input connection T1.

Corresponding to this, for example, the first capacitor C1 has a capacity of 0.47 µF and its maximum permissible voltage is 250V, while the second capacitor C2 has a capacity of 470 µF and its maximum permissible voltage is 100 V. Further, the maximum permissible voltage and current of the first and second diodes D1 and D2 are, for example, 600V and 1 A, respectively.

In order to obtain a DC voltage of 60 V with stability, we use the four series-connected Zener diodes ZD1 to ZD4 each having a Zener voltage of 15 V, but three series-connected Zener diodes, each having a Zener voltage of 20 V, may be used. Here, the description is given of the case where the AC voltage supplied from the AC power supply S is 200 V (peak value), the present invention is also applicable to the case where the AC voltage supplied from the AC power supply S is 283 V (peak value), i.e., the effective value is 200 V.

As the thermistor TH, for example, employed is a thermistor that has a resistance value of not less than 3.73 Ω and not more than 47 Ω within the operating ambient temperature limits (e.g., −20° C. to 70° C. ), and more specifically, it is for example, a product manufactured by Murata Manufacturing Co., Ltd., product number: NTPA7220LBMB0. The lower limit of 3.73 Ω is determined with reference to the magnitude of rush current that can occur at power-on, and the current resistance of the first and second diodes D1 and D2. The upper limit of 47 Ω is the value that is negligible compared with the impedance of the capacitors C1 and C2. Or, instead of the thermistor TH, a resistor of around 22 Ω may be employed.

Next, the operation principle of this power converter is described. In broad outline, an AC voltage supplied from the AC power supply S through the first and second input connections T1 and T2 is divided (stepped down) by the first and second capacitors C1 and C2, rectified to DC voltage by the first diode D1, smoothed by the second capacitor C2, and supplied, as an output voltage (60 V) defined by the Zener diodes ZD1 to ZD4, to the load side through the first and second output connections T3 and T4.

In more detail, when the AC power supply S has positive polarity to the first input connection T1, current (charge) flows on the first electric connection line L1 through the first capacitor C1 and the first diode D1 toward the second capacitor C2. Thereby, both the capacitors C1 and C2 are charged so that their first input connection T1 sides are higher in potential than their second input connection T2 sides. At this time, the capacitor C2 is charged to a voltage defined by the Zener diodes ZD1 to ZD4. Since, as above described, the capacity ratio of both the capacitors C1 and C2 is set large, for example, to 1:1000, the first capacitor C1 can sufficiently step down the voltage, and the second capacitor C2 can secure a voltage of 60 V.

Figure 3:
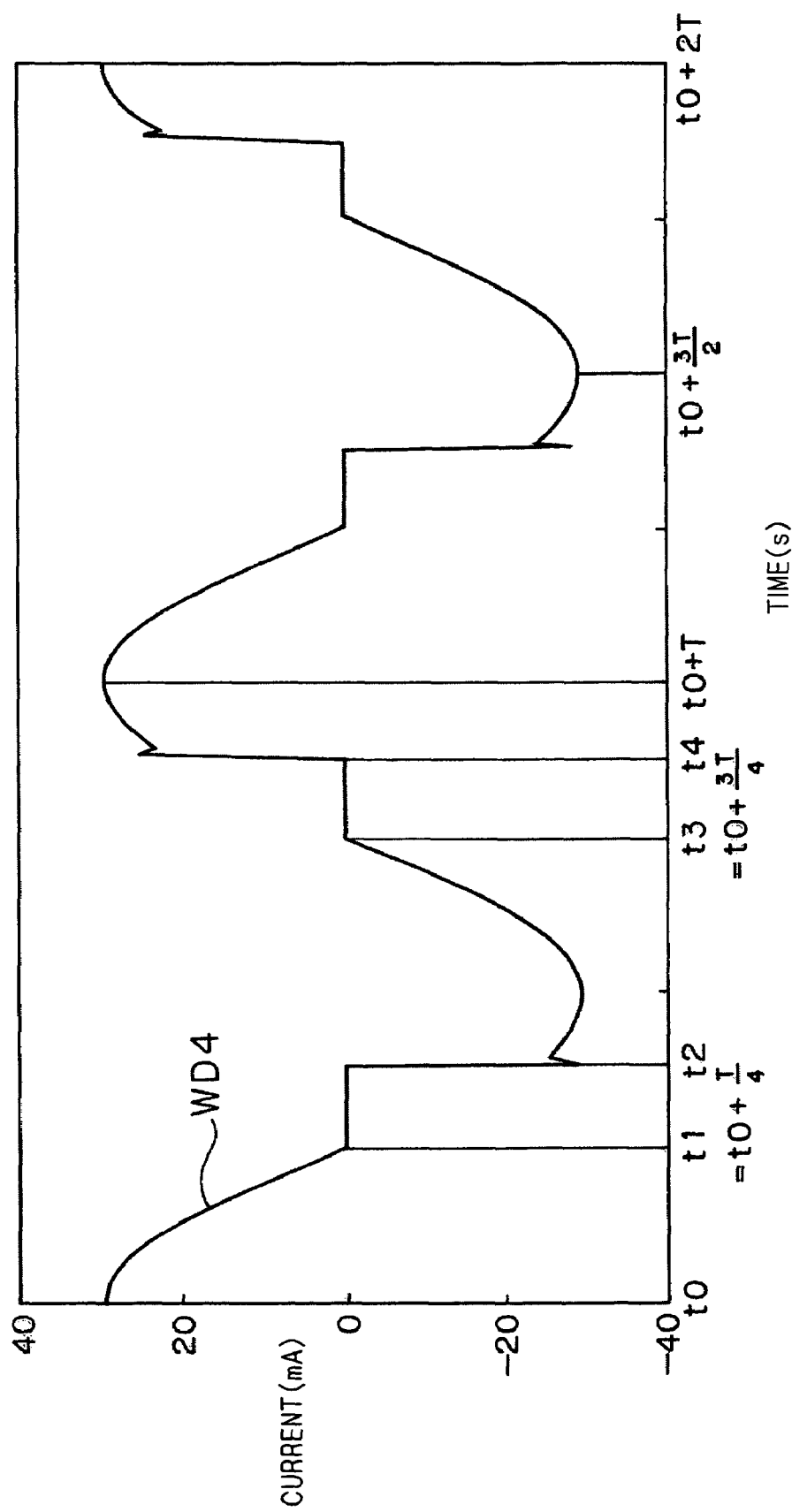
[FIG. 3] a waveform chart illustrating the change of current flowing to a first input connection on the circuit of FIG. 1.
Figure 4:
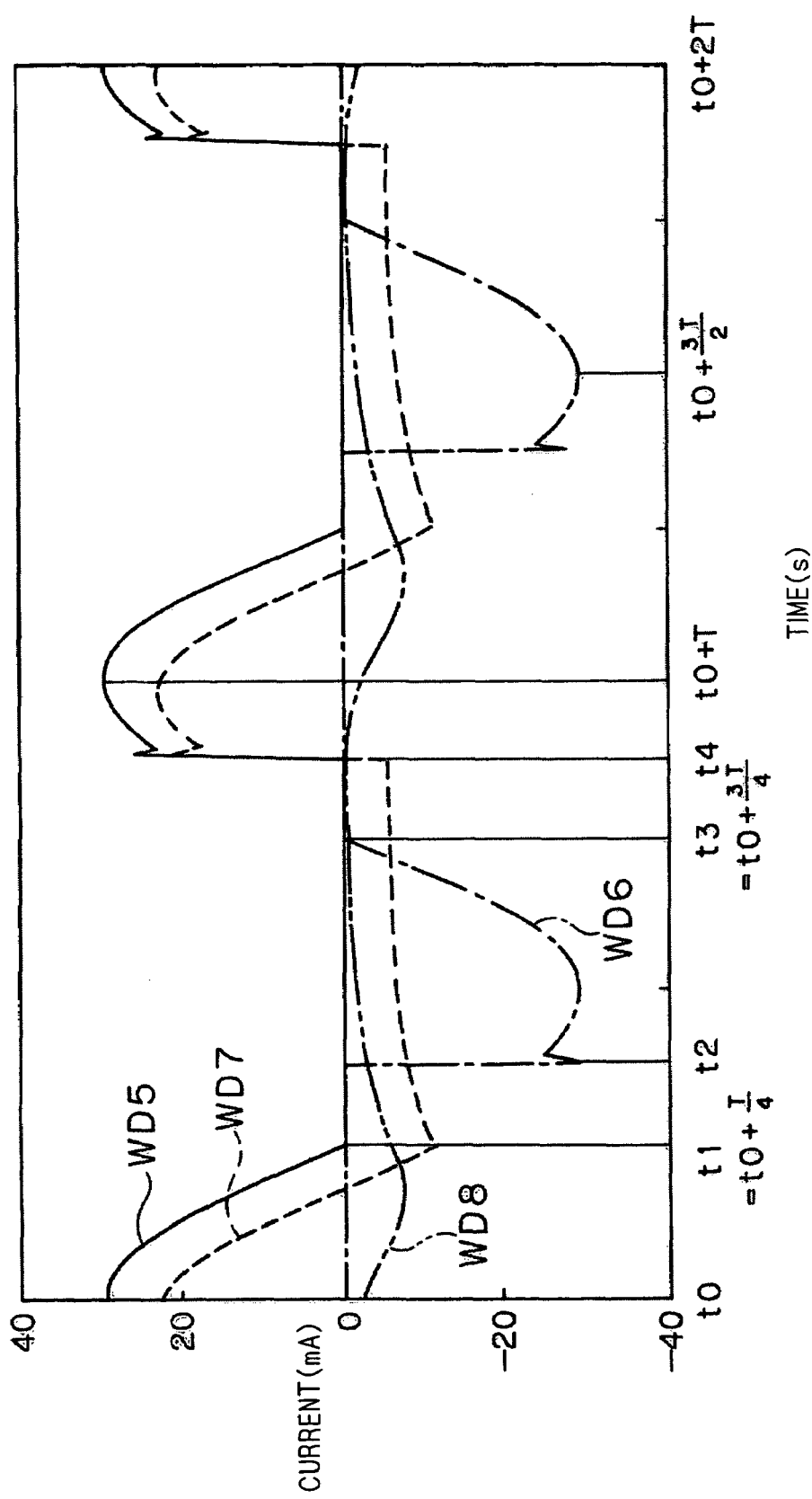
[FIG. 4] a waveform chart illustrating the change of current in each component on the circuit of FIG. 1.

Here, FIGS. 2 to 4 are waveform charts illustrating the potential and current changes of each component on the circuit of FIG. 1. The value of each component takes the above exemplified value. A waveform WD1 in FIG. 2 shows the potential change of the first input connection T1; a waveform WD2 in the same figure shows the change of voltage across the first capacitor C1; and a waveform WD3 in the same figure shows the potential change of the second output connection T3. Here, the waveform WD2 is positive when the first input connection T1 side is higher in potential than the second input connection T2 side.

A waveform WD4 in FIG. 3 shows the change of current flowing from the AC power supply S to the first input connection T1 when the direction of current flowing from the AC power supply S toward the first input connection T1 is the positive direction.

A waveform WD5 in FIG. 4 shows the change of current flowing to the first diode D1 when the direction of current flowing in the forward direction of the first diode D1 is the positive direction. A waveform WD6 in the same figure shows the change of current flowing to the second diode D2 when the direction of current flowing in the reverse direction of the second diode D2 is the positive direction. A waveform WD7 in the same figure shows the change of current supplied to the second capacitor C2 when the direction of current flowing from the first diode D1 side toward the second capacitor C2 is the positive direction. A waveform WD8 in the same figure shows the change of current flowing to the Zener diodes ZD1 to ZD4 when the direction of current flowing in the forward direction of the Zener diodes ZD1 to ZD4 is the positive direction.

First, FIG. 2 is explained. Hereinbelow, for the sake of simplicity, the forward voltages of the diodes are ignored. As shown by the waveform WD1, the AC voltage outputted from the AC power supply S fluctuates with a period of T, taking a voltage value of 0 at time t0 and taking the maximum value at time t1=t0+T/4.

At time t1, a voltage of 60 V is supported by parallel connection of the series-connected Zener diodes ZD1 to ZD4 (hereinafter referred to generically as a Zener diode ZD) and the capacitor C2. Thus, the diode D2 is not conducting due to application of a reverse voltage of 60 V, and the voltage across the capacitor C1 is 140 V as shown by the waveform WD2 at time t1. That is, the anode potential of the diode D1 is 60 V.

Thereafter, the anode potential of the diode D1 decreases with a reduction in the AC voltage outputted from the AC power supply S, and the diode D1 becomes nonconductive. In that case, there is no path for the capacitor C1 to discharge, so that the anode potential of the diode D1 continues to decrease with the voltage across the capacitor C1 kept at 140 V. That is, during the time between t1 and t2, the diodes D1 and D2 are both nonconducting.

Then, when the AC voltage drops to 140 V at time t2, the diode D2 becomes conductive. Thereby, the anode potential of the diode D1 is sharply reduced to almost zero, and since the cathode potential of the diode D1 is kept at around 60 V by the parallel connection of the capacitor C2 and the Zener diode ZD, the diode D1 is still maintained in the nonconducting state. Thus, even if the AC voltage drops later on, as long as the diode D2 is conducting, the voltage across the capacitor C1 continues to coincide with the AC voltage outputted from the AC power supply S and becomes −200 V at time t3=t0+ 3T/4. All this while, the anode potential of the diode D1 is zero.

Thereafter, when the AC voltage starts to increase from the time t3, the anode potential of the diode D1 increases with the voltage across the capacitor C1 maintained, and the diode D2 becomes nonconductive. Since the diode D1 is also nonconducting, the voltage across the capacitor C1 is kept at −200 V.

Then, when the AC voltage increases to −140 V at time t4, the anode potential of the diode D1 becomes (−140)−(−200) =60 [V] since the voltage across the capacitor C1 is maintained at −200 V, and thereby, the diode D1 becomes conductive. That is, the diodes D1 and D2 are both nonconducting during the time between t3 and t4, but the diode D1 becomes conductive after time t4.

Thereafter, the AC voltage and the voltage across the capacitor C1 maintain a difference of 60 V between them until time t0+T.

In FIG. 3, when the waveform WD4 shows positive current values, the diode D1 is conducting; and when it shows negative current values, the diode D2 is conducting. In FIG. 4, the waveforms WD5 and WD6 correspond respectively to the positive and negative current values of the waveform WD4. Both the waveforms show some overshoots at the start of conduction of the diodes D1 and D2, but their peaks are controlled by the function of the thermistor TH.

Since current flows in the reverse direction of the Zener diode ZD (waveform WD8) and is supplied to the loads connected through the first and second output connections T3 and T4, in FIG. 4, current supplied to the second capacitor C2 (waveform WD7) is shifted to the negative side of current flowing to the diode D1 (waveform WD5).

If the diode D2 is not provided, the diode D1 will not become conductive after its anode potential becomes 60 V. This is because, since there is no path for the capacitor C1 to transfer its stored charge and thus the voltage across the capacitor C1 is maintained at 140 V, the anode potential of the diode D1 transitions between −340 V and 60 V. In this case, there is also no path for charge of the capacitor C1, so that the voltage supplied to the loads will decrease.

On the other hand, the presence of the diode D2 allows the capacitor C1 to be discharged without drawing the charge of the capacitor C2 and further to be reverse charged. This reduces the voltage across the capacitor C1, allows the conduction of the diode D1, and makes the capacitor C2 chargeable.

As so far described, according to this preferred mode, the voltage drop is caused not by a resistor but by the first capacitor C1. This is highly efficient because no joule loss occurs during the voltage drop, and thus, there is no need to consider a countermeasure against heat for peripheral components. Also, there is no need to use an expensive and high-capacity step-down resistor as in conventional techniques, which results in cost reduction.

Further, the unnecessity of using a step-down resistor, which is often large in size, allows a reduction in the mounting area of components and in the size of a device configuration such as a printed circuit board, which is advantageous in terms of structure and cost.

Further, the Zener diode ZD enables the output of a stable DC voltage.

Further, the thermistor TH allows effective control of rush current flowing on the first and second electric connection lines L1 and L2.

Further, since the capacity ratio of the first capacitor C1 to the second capacitor C2 is set to 1:1000, the input AC voltage can effectively be divided and rectified to DC voltage by the first and second capacitors C1 and C2.

Second Preferred Mode

As above described, the change of the AC voltage supplied from the AC power supply S through the first and second input connections T1 and T2 causes fluctuations in the voltage across the capacitor C1. Thus, even with the occurrence of large ripples of the above AC voltage, the charge and discharge of the capacitor C1 are caused, and large current flows to the Zener diode ZD. This may increase the thermal load of the Zener diode ZD and lead to thermal breakdown.

For example, it is assumed that, in the first preferred mode, the AC voltage inputted from the AC power supply S rapidly increases from around 200 V. In this case, since the voltage of approximately 140 V across the capacitor C1 is maintained, the anode potential of the diode D1 also rapidly increases, and the diode D1 becomes conductive. The potential of the first output connection T3 (i.e., the cathode potential of the diode D1), which is caused to increase by the conduction of the diode D1, is maintained at 60 V by conduction of the Zener diode ZD. That is, the ripples cause a phenomenon similar to the charge of the capacitor C1 during the time between t0 and t1. This phenomenon can occur not only in the case where the AC voltage rapidly increases from around 200 V but also in a situation where the anode potential of the diode D1 is increased to over 60 V by the ripples.

Conversely, the phenomenon can also occur in a situation where the anode potential of the diode D1 drops to below 0 V. In such a situation where the anode potential of the diode D1 rapidly decreases with a rapid drop in the AC voltage, the diode D2 once becomes conductive. Then, the anode potential of the diode D1 returns to 0 V by a phenomenon similar to the discharge and reverse charge of the capacitor C1 during the time interval between t2 and t3. However, if the AC voltage returns to its original potential after the rapid drop, the anode potential of the diode D1 rapidly increases and the diode D1 and the Zener diode ZD become conductive, because of a shortage of divided potential supported by the capacitor C1.

Considering from a different point of view, since the anode and cathode potentials of the diode D1 are clamped respectively to 0 V and 60 V, ripples of those potentials cause pulsations of the charge and discharge of the capacitor C1, resulting in the flow of unnecessary current to the Zener diode ZD.

Figure 5:
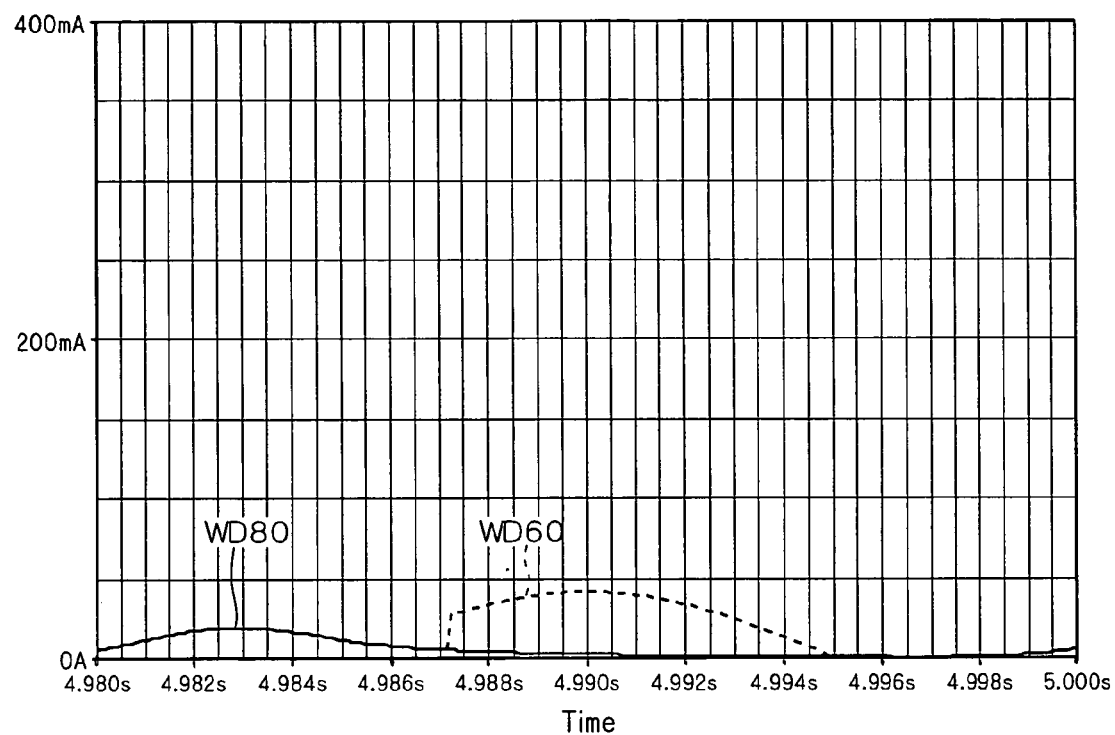
[FIG. 5] a graph showing the characteristics of the power converter according to the first preferred mode.
Figure 6:
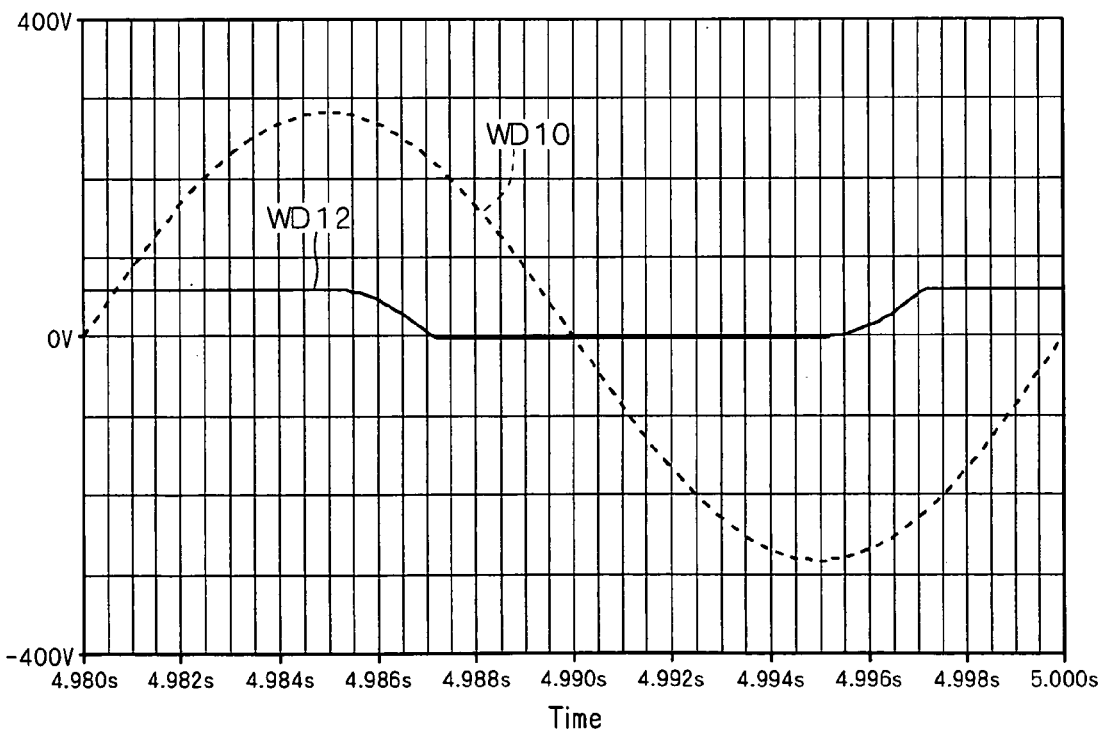
[FIG. 6] a graph showing the characteristics of the power converter according to the first preferred mode.
Figure 7:
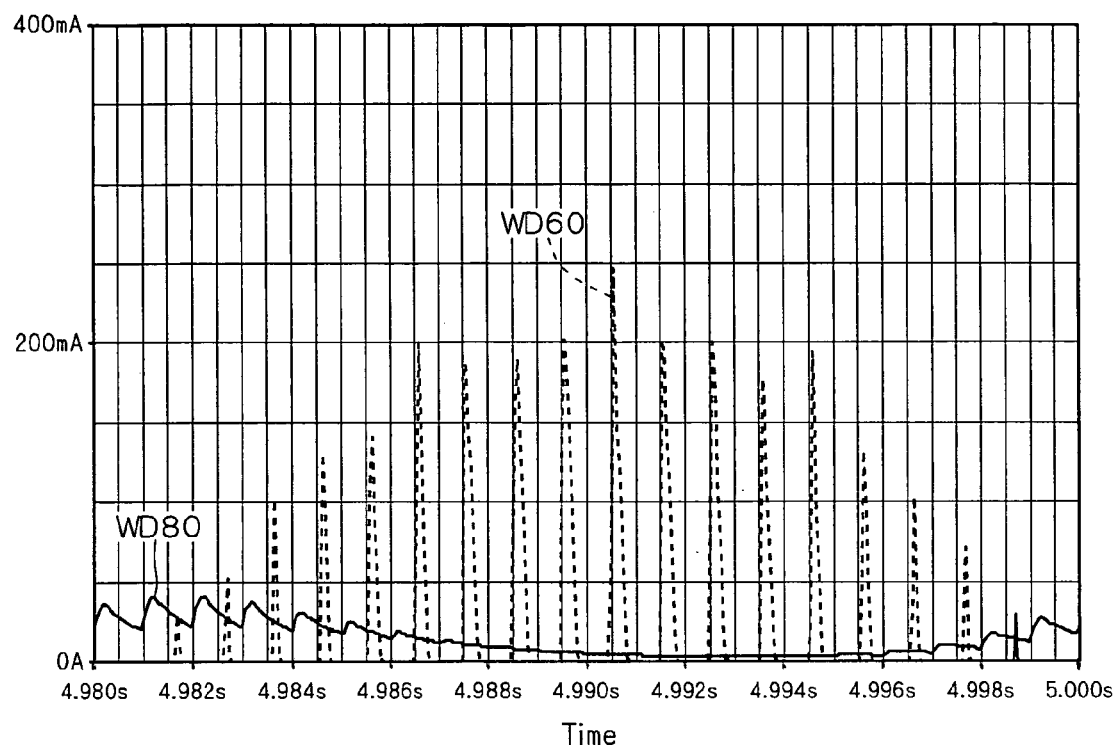
[FIG. 7] a graph showing the characteristics of the power converter according to the first preferred mode.
Figure 8:
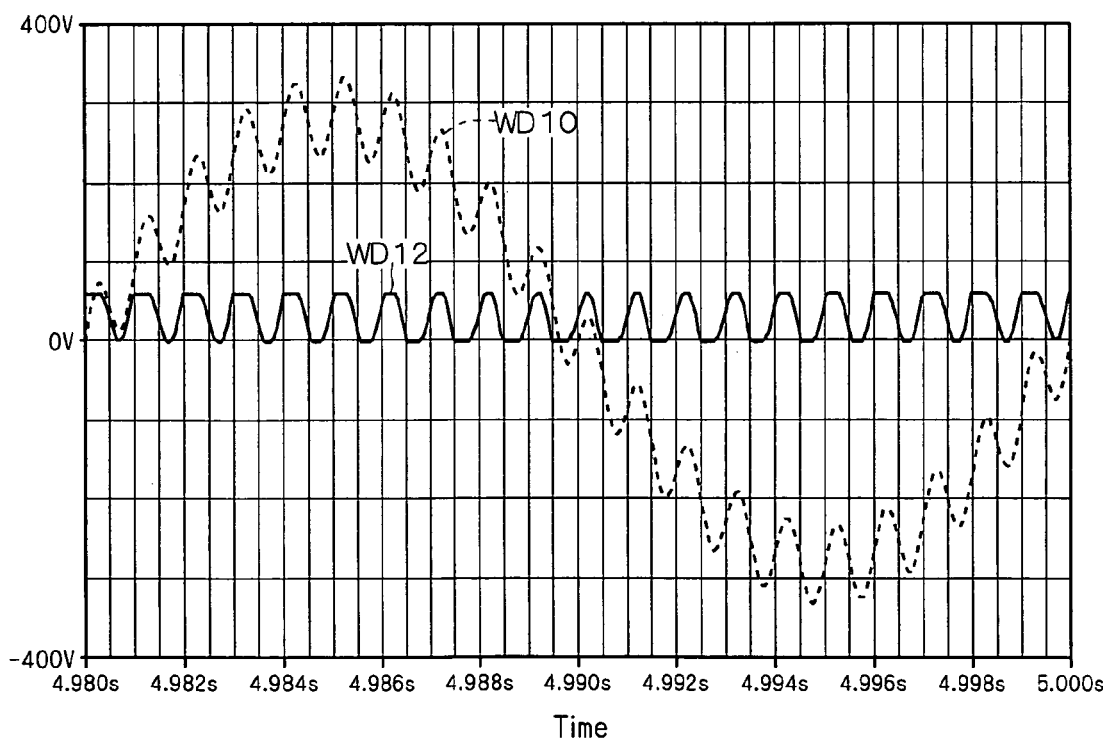
[FIG. 8] a graph showing the characteristics of the power converter according to the first preferred mode.

FIGS. 5 to 8 are graphs for explaining the above phenomenon. FIGS. 5 and 6 show the characteristics of the power converter shown in the first preferred mode, with no ripples of the AC voltage. FIGS. 7 and 8 show the characteristics of the power converter shown in the first preferred mode, with ripples of the AC voltage. Here, the first capacitor C1 has a capacity of 0.47 µF, the second capacitor C2 has a capacity of 470 µF, and the thermistor TH has a resistance value of 22 Ω.

In these figures, a waveform WD80 shows the change of current flowing to the Zener diode ZD when the direction of current flowing in the reverse direction of the Zener diode ZD is the positive direction, and it is of opposite sign to the waveform WD8 (in FIG. 4). A waveform WD60 shows the change of current flowing to the second diode D2 when the direction of current flowing in the forward direction of the second diode D2 is the positive direction, and it is of opposite sign to the waveform WD6 (in FIG. 4). A waveform WD10, like the waveform WD1 (in FIG. 2), shows the potential change of the first input connection T1, showing the case where the AC voltage employed has a peak value of 283 V and a frequency of 50 Hz. A waveform WD12 shows the anode potential of the diode D1, which corresponds to a difference of the values shown by the waveforms WD1 and WD2.

Although not shown, a voltage between the first and second output connections T3 and T4 is maintained at 60 V regardless of the presence or absence of ripples.

FIGS. 5 and 6 show the same contents as FIGS. 4 and 2, respectively, although the AC voltage has a different peak value and the positive and negative parts of the waveforms are converted. The waveform WD12 ranges between 0 and 60 V.

FIGS. 7 and 8 illustrate the case where ripples with a peak value of 50 V and a frequency of 1000 Hz are superimposed on the AC voltage. The waveform WD12 in FIG. 8 shows that the charge and discharge of the capacitor C1 are repeated. As shown by the waveform WD80 in FIG. 7, current flowing to the Zener diode ZD also has ripples, and it is clearly greater than that shown by the waveform WD80 in FIG. 5.

Thus, a second preferred mode provides a technique for reducing the amount of increase in the current flowing to the Zener diode ZD even with the occurrence of above ripples.

Figure 9:
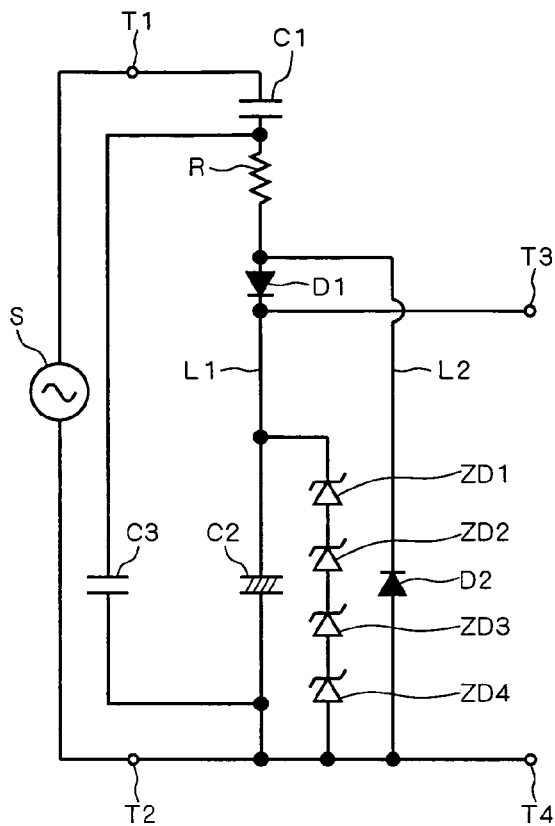
[FIG. 9] a circuit diagram of a power converter according to a second preferred mode of the present invention.

FIG. 9 is a circuit diagram of a power converter according to the second preferred mode of the present invention. This power converter is configured such that a resistor R is employed instead of the thermistor TH in the power converter according to the first preferred mode, and that a capacitor C3 is added which is connected between one end of the resistor R on the first input connection T1 side and the second input connection T2.

The presence of the capacitor C3 makes another path that allows the transfer of charge from the capacitor C1, other than the paths to the diodes D1 and D2 and the Zener diode ZD. That is, the voltage across the capacitor C1 can fluctuate according to the ripples of the AC voltage.

This is formulated as follows. If we introduce the amplitude voltage Vd of ripples and the voltage Vz supported by the Zener diode ZD and adopt the same symbols for the capacitance values of the capacitors C1 and C3, the amount of charge transferred from the capacitor C1 by the pulsations can be expressed as $Q1=C1 \cdot (Vd-Vz)$. If this amount of charge is covered by charge $Q3=C3 \cdot Vz$ that is accumulated in the capacitor C3 by the voltage Vz, it is possible to reduce the charge transfer, i.e., current, through the Zener diode ZD. Thus, the following should hold: $C3 \geq C1 \cdot (Vd-Vz)/Vz$. That is, if the capacitance values of the capacitors C1 and C3 are set to be approximately the same, the flow of unnecessary current to the Zener diode ZD can be suppressed even if the ripple amplitude of the AC voltage is about two times the DC voltage to be outputted.

For example in the aforementioned example, ripples occur with an amplitude of 100 V. Thus, for adoption of the capacitor C1 with a capacitance value of 0.47 µF, the capacitor C3 with a capacitance value of 0.33 µF can be adopted in consideration of a series of capacitor specification values.

While the resistor R is not taken into consideration in the aforementioned calculation, in practice it is desirable, in order to limit both steady-state and rush currents, to adopt a resistor of approximately one order of magnitude greater than that in the first preferred mode, for example a resistor of 22 Ω, thereby to increase a CR time constant.

Figure 10:
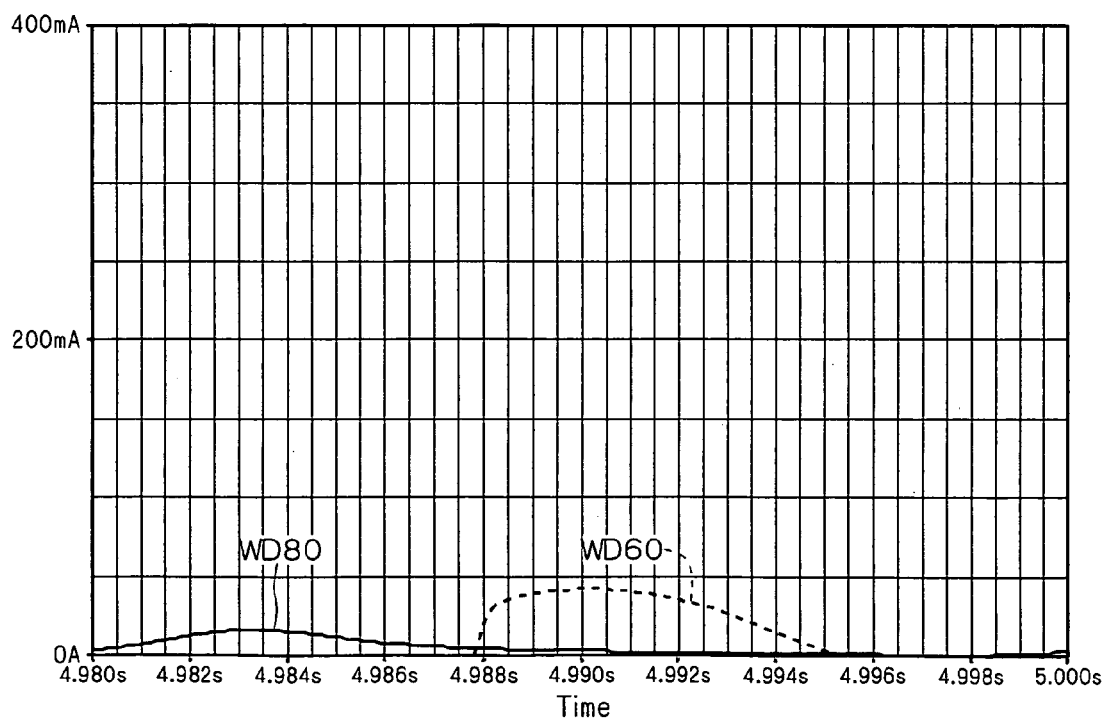
[FIG. 10] a graph showing the characteristics of the power converter according to the second preferred mode.
Figure 11:
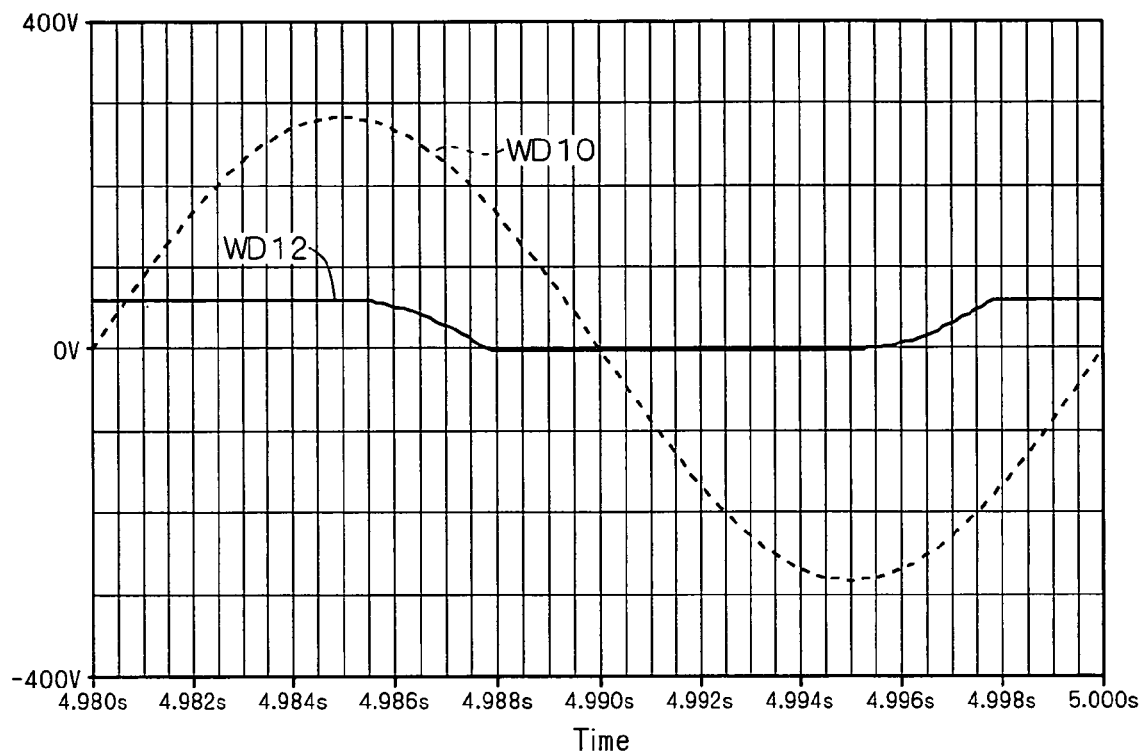
[FIG. 11] a graph showing the characteristics of the power converter according to the second preferred mode.

FIGS. 10 and 11 are graphs showing the waveforms with no power supply distortion in the power converter according to the second preferred mode. The capacitors C1 and C2 have the same capacitance values as in the first preferred mode shown in FIGS. 5 to 8, the capacitor C3 has a capacitance value of 0.33 µF, and the resistor R has a resistance value of 220 Ω. The symbols of the waveforms are common to those in FIGS. 5 to 8. The waveforms shown in FIGS. 10 and 11 are nearly identical to those (in FIGS. 5 and 6) in the case with no power supply distortion in the power converter according to the first preferred mode.

Figure 12:
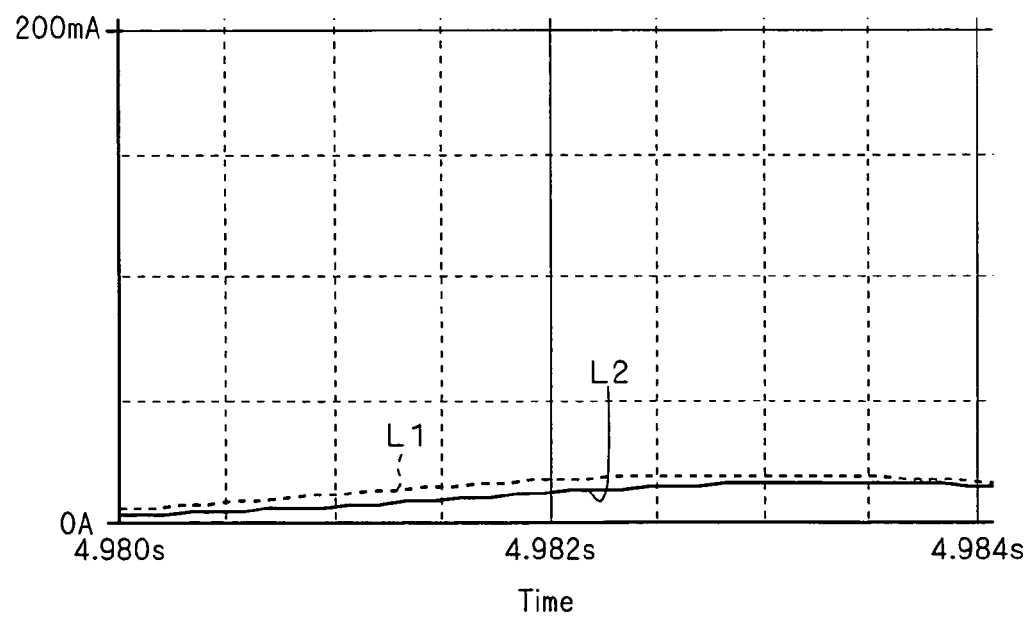
[FIG. 12] a graph showing the comparison of the characteristics of the power converter between the first preferred mode and the second preferred mode.

FIG. 12 shows a comparison of the waveform WD80 in the case with no ripples of the AC voltage and at an early stage of the period when the AC voltage is positive, the graphs L1 and L2 corresponding to the waveforms WD80 in the first and second preferred modes, respectively. It can be seen that, even in the case with no ripples, the current flowing to the Zener diode ZD is smaller in the second preferred mode than in the first preferred mode.

Figure 13:
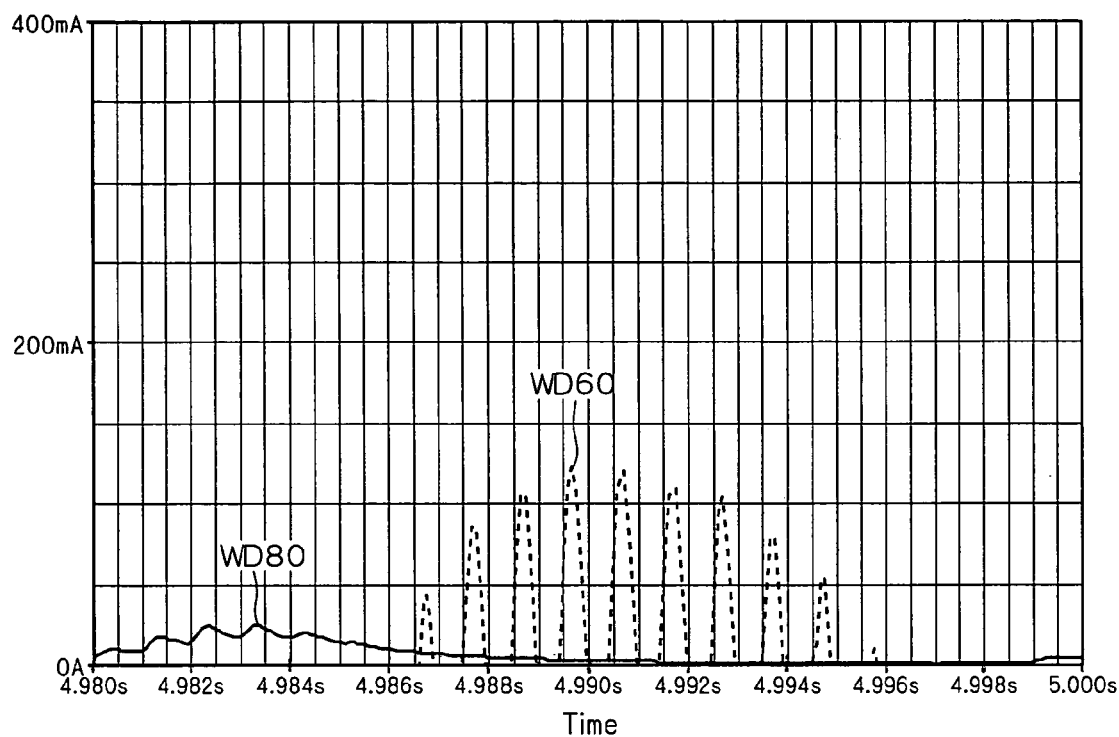
[FIG. 13] a graph showing the characteristics of the power converter according to the second preferred mode.
Figure 14:
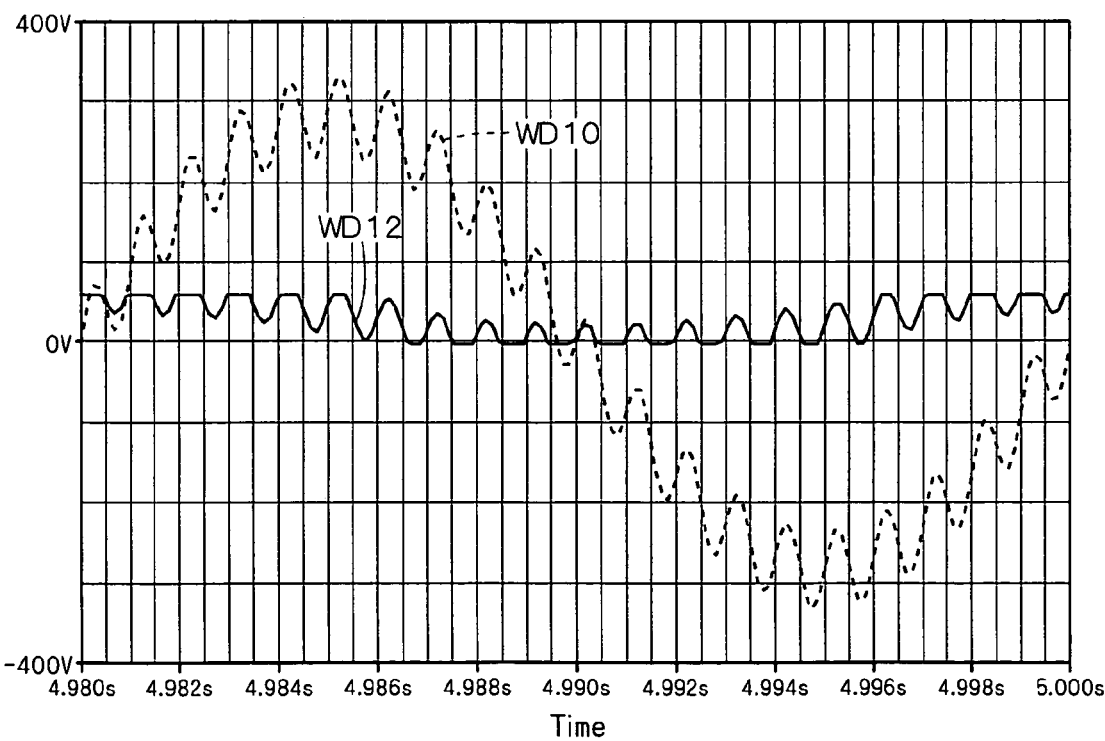
[FIG. 14] a graph showing the characteristics of the power converter according to the second preferred mode.

FIGS. 13 and 14 illustrate the case where ripples with a peak value of 50 V and a frequency of 1000 Hz are superimposed on the AC voltage, which correspond respectively to FIGS. 7 and 8 in the first preferred mode. Although not shown, the voltage between the first and second output connections T3 and T4 is maintained at 60 V regardless of the presence or absence of ripples.

Figure 15:
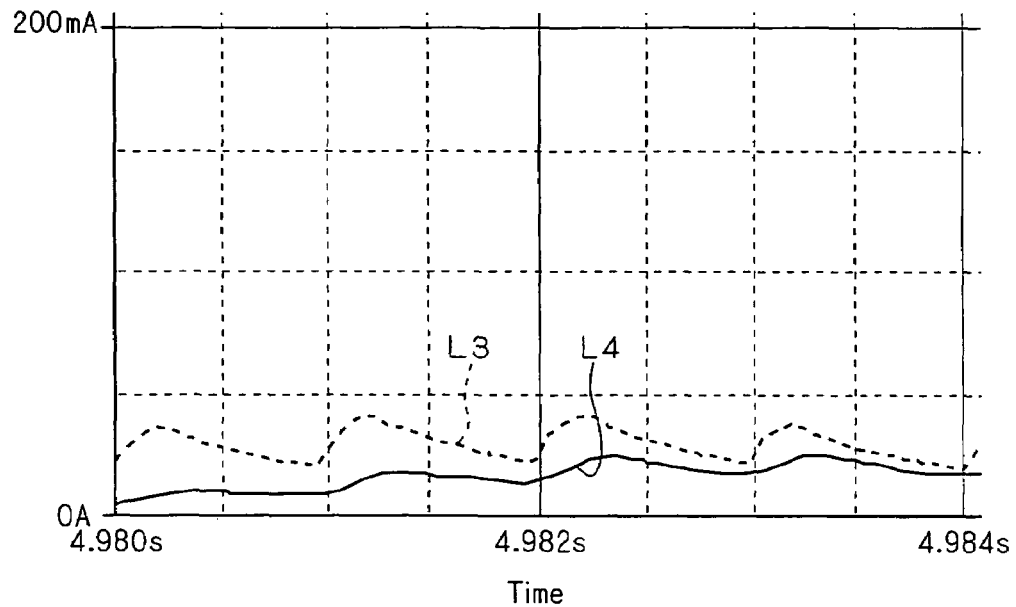
[FIG. 15] a graph showing the comparison of the characteristics of the power converter between the first preferred mode and the second preferred mode.

FIGS. 15 shows a comparison of the waveform WD80 at an early stage of the period when the AC voltage is positive in FIGS. 7 and 13, the graphs L3 and L4 corresponding to the waveforms WD80 in the first and second preferred modes, respectively. It can be seen that the current flowing to the Zener diode can be made much smaller in the second preferred mode than in the first preferred mode.

Third Preferred Mode

Figure 16:
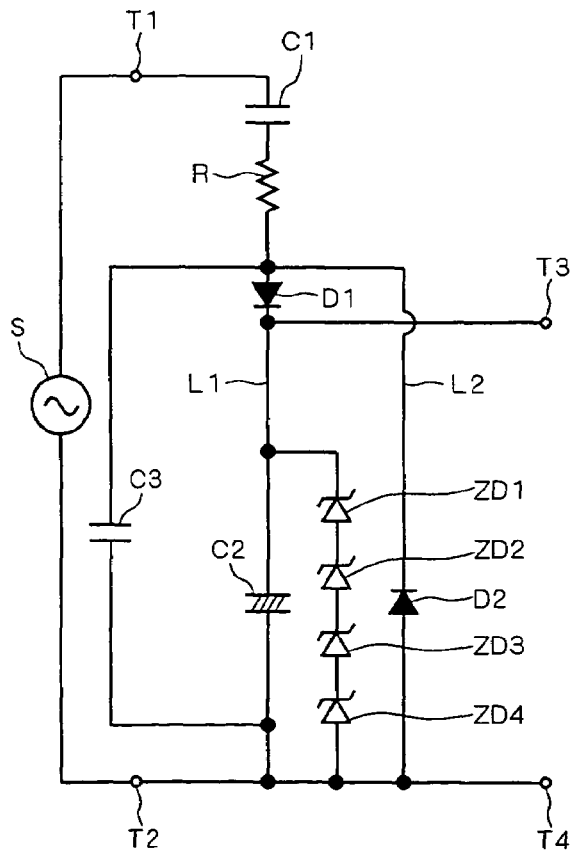
[FIG. 16] a circuit diagram of a power converter according to a third preferred mode of the present invention.

FIG. 16 is a circuit diagram of a power converter according to a third preferred mode of the present invention. This power converter is different from that according to the second preferred mode, in that the capacitor C3 and the resistor R are connected at a different point. More specifically, the capacitor C3 is connected between one end of the resistor R on the second input connection T2 side and the second input connection T2.

FIGS. 17 and 18 are graphs showing the waveforms in the case with no power supply distortion in the power converter according to the third preferred mode. The same specifications as in the second preferred mode are adopted for the capacitors C1, C2, and C3 and the resistor R. The symbols of the waveforms are common to those in FIGS. 5 to 8, 10, 11, and the like. The waveforms shown in FIGS. 17 and 18 are nearly identical to those (in FIGS. 10 and 11) in the case with no power supply distortion in the power converter according to the second preferred mode.

Figure 19:
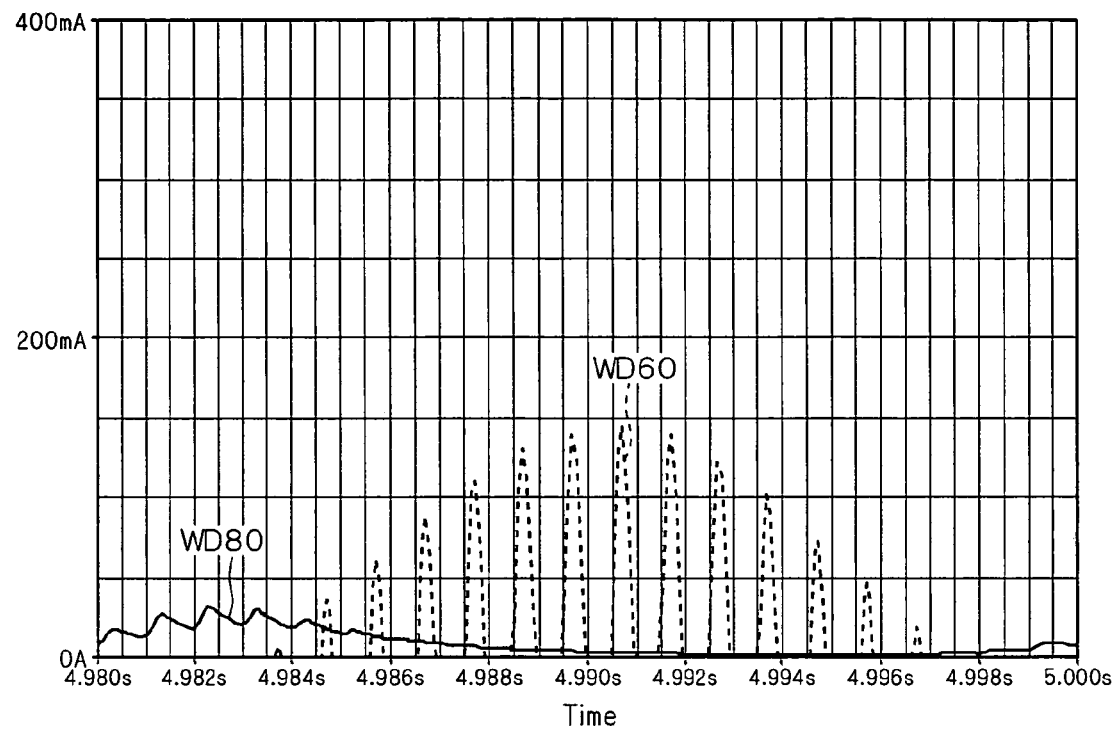
[FIG. 19] a graph showing the characteristics of the power converter according to the third preferred mode.
Figure 20:
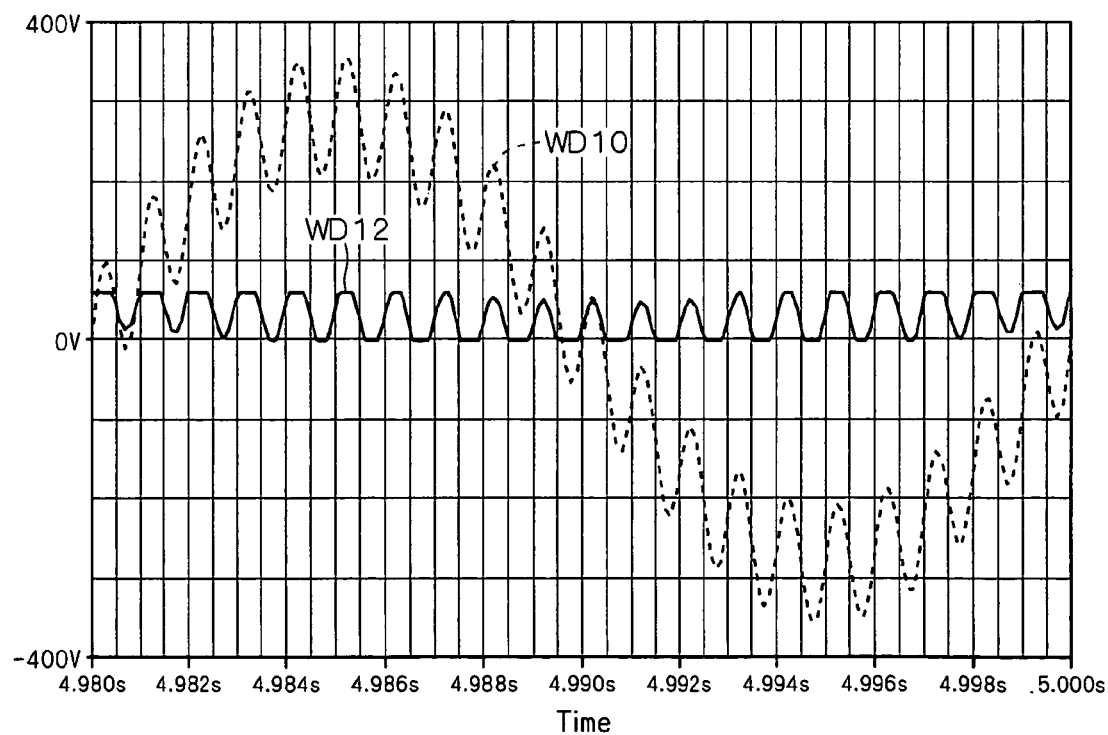
[FIG. 20] a graph showing the characteristics of the power converter according to the third preferred mode.
Figure 21:
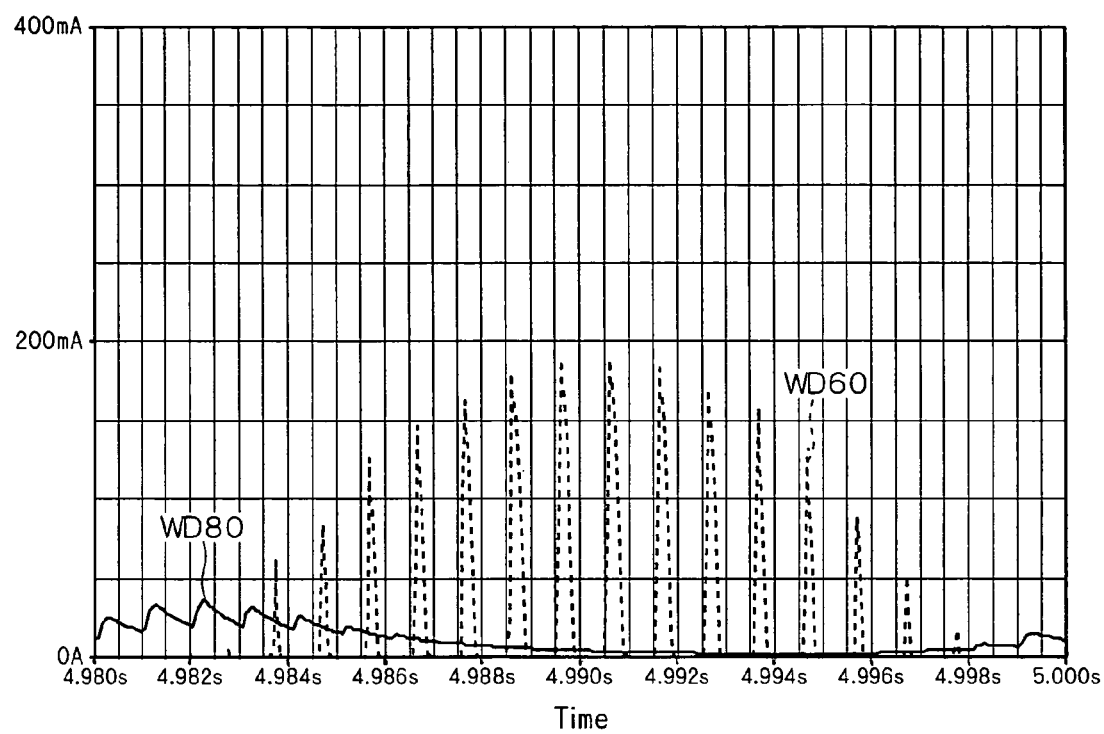
[FIG. 21] a graph showing the characteristics of the power converter according to the second preferred mode.
Figure 22:
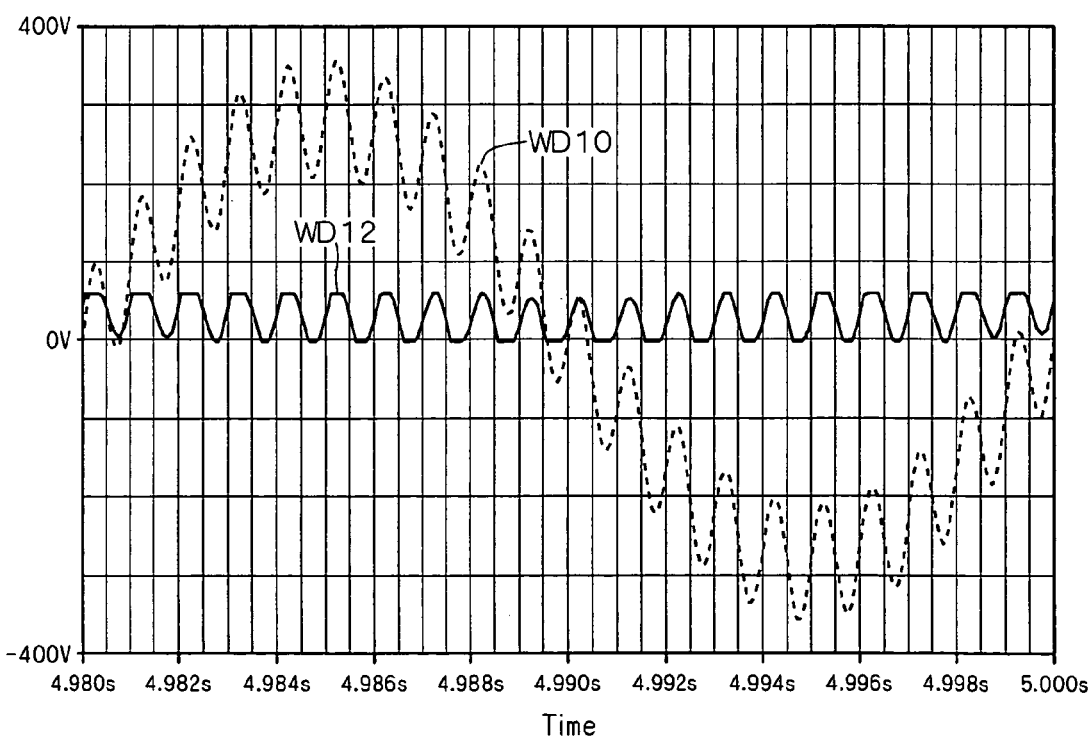
[FIG. 22] a graph showing the characteristics of the power converter according to the second preferred mode.

FIGS. 19 to 22 illustrate the case where ripples with a peak value of 75 V and a frequency of 1000 Hz are superimposed on the AC voltage. FIGS. 19 and 20 show the characteristics of the power converter according to the third preferred mode, and FIGS. 21 and 22 show the characteristics of the power converter according to the second preferred mode. Although not shown, the voltage between the first and second output connections T3 and T4 is maintained at 60 V regardless of the presence or absence of ripples.

Figure 23:
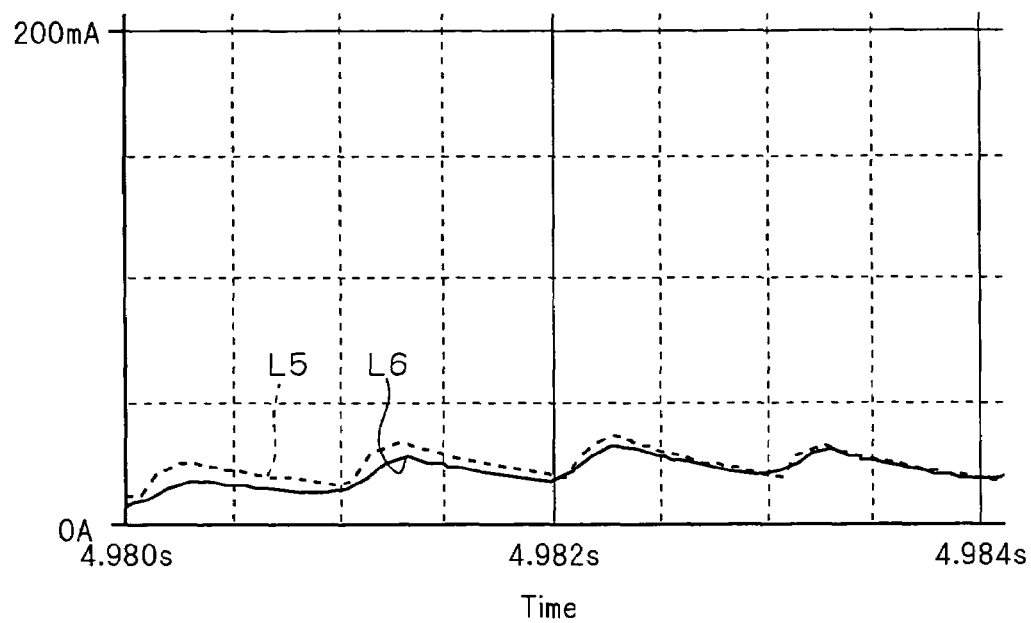
[FIG. 23] a graph showing the comparison of the characteristics of the power converter between the second preferred mode and the third preferred mode.
Figure 24:
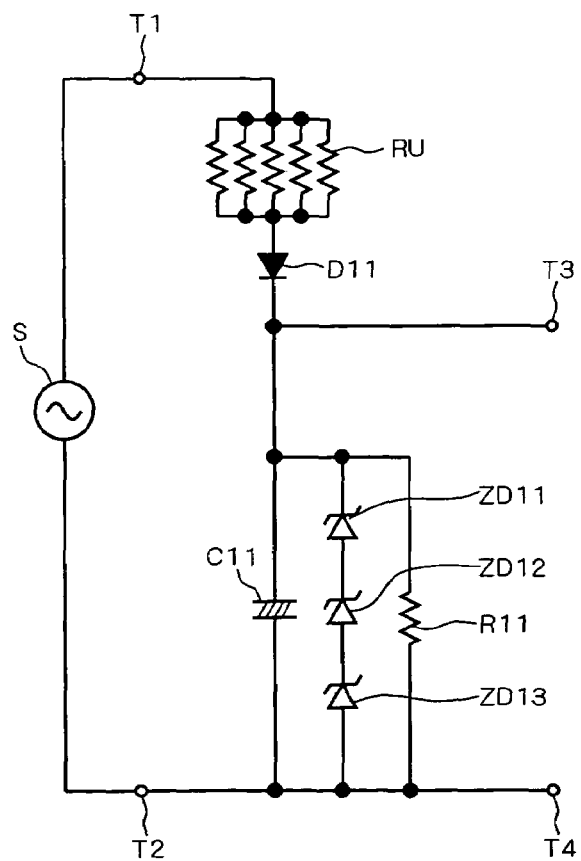
[FIG. 24] a circuit diagram of a conventional power converter.
Figure 25:
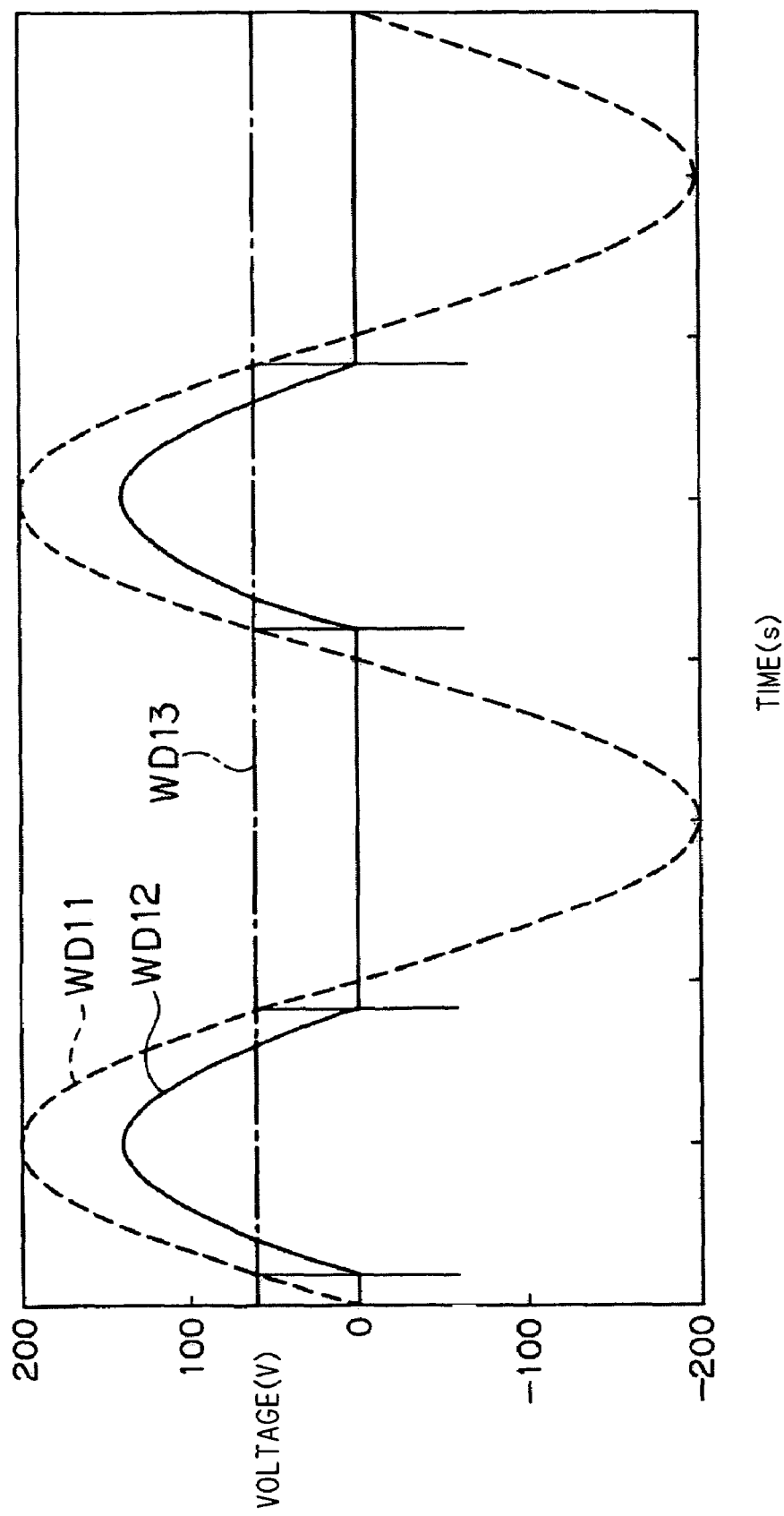
[FIG. 25] a waveform chart illustrating the potential change of each component on the circuit of FIG. 24.
Figure 26:
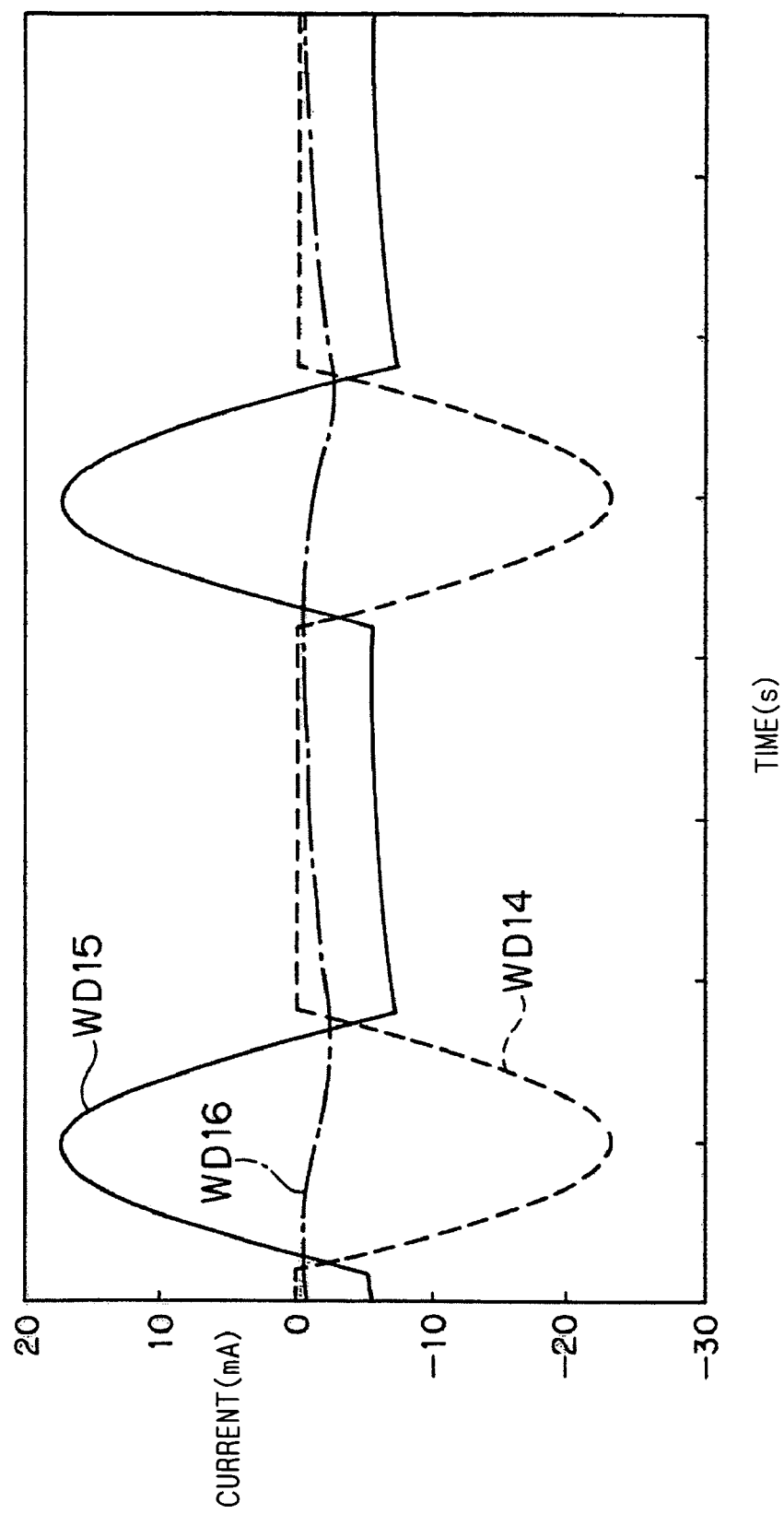
[FIG. 26] a waveform chart illustrating the change of current in each component on the circuit of FIG. 24.

FIG. 23 shows a comparison of the waveform WD80 at an early stage of the period when the AC voltage is positive in FIGS. 19 to 22, the graphs L5 and L6 corresponding to the waveforms WD80 in the second and third preferred modes, respectively. It can be seen that the current flowing to the Zener diode ZD can be made much smaller in the third preferred mode than in the second preferred mode.

This is considered because, during charge transfer between the capacitors C1 and C3, the effect of the time constant determined by the resistor R is greater in the third preferred mode than in the second preferred mode. In other words, the time constant of a CR series circuit formed of the capacitor C1 and the resistor R can effectively control the influence of ripples of the AC voltage.

However, in terms of bringing down the power rating of the resistor R and reducing the size of components, the power converter according to the second preferred mode is more desirable. This is because charge transfer between the capacitors C1 and C3 through the resistor R is not remarkable, and therefore, current flowing to the resistor R can be reduced even with ripples with high frequencies.

While the invention has been shown and described in detail, the foregoing description is in all aspects illustrative and not restrictive. It is therefore understood that numerous modifications and variations can be devised without departing from the scope of the invention.

The invention claimed is:

1. A power converter for stepping down and converting AC voltage to DC voltage,
    said power converter comprising:
    first and second input connections for inputting output of said AC voltage;
    a first capacitor and a second capacitor interposed in series on a first electric connection line between said first input connection and said second input connection, in order from a side of said first input connection;
    a first diode interposed between the first capacitor and said second capacitor on said first electric connection line so that its forward direction is toward said second input connection;
    a second diode interposed on a second electric connection line so that its reverse direction is toward said second input connection, said second electric connection line connecting a point between said first capacitor and said first diode on said first electric connection line, and said second input connection;
    a first output connection for output of said DC voltage, which is connected between said first diode and said second capacitor on said first electric connection line; and
    a second output connection for output of said DC voltage, which is connected to said second input connection, and
    a third capacitor, one end of which is connected between said first capacitor and said first diode on said first electric connection line, and the other end of which is connected to said second input connection.

2. The power converter as set forth in claim 1, further comprising:
    a Zener diode interposed between said first output connection and said second output connection so that its forward direction is toward said first output connection.

3. The power converter as set forth in claim 2, further comprising:
    a resistor resistance interposed along said first electric connection line delimited by a point of connecton at said first and second electric connection lineand the first input connection.

4. The power converter as set forth in claim 3, wherein said resistor is a thermistor.

5. The power converter as set forth in claim 1, wherein a capacity ratio of said first capacitor to said third capacitor is set to about 1:1.

6. The power converter as set forth in claim 2, wherein a capacity ratio of said first capacitor to said third capacitor is set to about 1:1.

7. The power converter as set forth in claim 3, wherein a capacity ratio of said first capacitor to said third capacitor is set to about 1:1.

8. The power converter as set forth in claim 1, wherein a capacity ratio of said first capacitor to said second capacitor is set to 1:1000.

* * * * *